United States Patent
Wang et al.

(10) Patent No.: US 7,092,859 B2
(45) Date of Patent: Aug. 15, 2006

(54) FACE MODIFICATION TOOL

(75) Inventors: Sha Wang, Ithaca, NY (US); William L. Myers, Ithaca, NY (US); John R. Wallace, Ithaca, NY (US)

(73) Assignee: Autodesk, Inc., San Rafael, CA (US)

( * ) Notice: Subject to any disclaimer, the term of this patent is extended or adjusted under 35 U.S.C. 154(b) by 959 days.

(21) Appl. No.: 10/132,544

(22) Filed: Apr. 25, 2002

(65) Prior Publication Data

US 2003/0201992 A1 Oct. 30, 2003

(51) Int. Cl.
G06F 7/60 (2006.01)
G06T 17/00 (2006.01)

(52) U.S. Cl. .......................................... 703/2; 345/420

(58) Field of Classification Search ............. 703/2; 345/420

See application file for complete search history.

(56) References Cited

U.S. PATENT DOCUMENTS

| 4,821,214 | A | 4/1989 | Sederberg |
| 5,396,590 | A | 3/1995 | Kreegar |
| 5,815,154 | A | 9/1998 | Hirschtick et al. |
| 6,392,645 | B1 * | 5/2002 | Han et al. ............ 345/420 |

FOREIGN PATENT DOCUMENTS

WO    WO 95/11482    4/1995

* cited by examiner

*Primary Examiner*—Hugh Jones
(74) *Attorney, Agent, or Firm*—Gates & Cooper LLP

(57) ABSTRACT

One or more embodiments of the invention provide a method, apparatus, system, and article of manufacture for modifying a three-dimensional model. A composite three-dimensional model is displayed in a computer implemented solid modeling system. The composite model comprises a first primitive and a second primitive. A first face of the first primitive is selected. Once selected, a first boundary representation of the first primitive is modified using the selected first face. Thereafter, a second boundary representation of the second primitive is automatically modified based on the modification to the first boundary representation.

39 Claims, 7 Drawing Sheets

FACE MODIFICATION TOOL

CROSS-REFERENCE TO RELATED APPLICATIONS

This application is related to the following co-pending and commonly-assigned patent application, which application is incorporated by reference herein:

PCT Patent Application No. PCT/US01/02310, entitled "METHOD AND APPARATUS FOR PROVIDING ACCESS TO AND WORKING WITH ARCHITECTURAL DRAWINGS ON THE INTERNET", by Douglas G. Look, et. al., filed on Jan. 24, 2001.

BACKGROUND OF THE INVENTION

1. Field of the Invention

The present invention relates generally to a three-dimensional modeling system, and in particular, to a method, apparatus, and article of manufacture for directly repositioning a face of a three-dimensional model.

2. Description of the Related Art

The use of constructive solid geometry (CSG) application programs is well known in the art. CSG application programs ate often expensive, complex, and difficult to learn how to use. Three-dimensional (3D) models displayed in a CSG application are made up of one or more features or primitives of various types. The geometry of individual features or primitives is determined by parameters. To modify the 3D model, each parameter of each primitive must be individually modified by a user. Such modifications are typically performed by a user using dialogs or handles on an attribute-by-attribute basis. Further, when modifying a face of a 3D model having multiple different features, each feature must be independently modified using a handle or dialog. Such modifications are time consuming and require the performance of multiple actions by a user. These problems may be better understood by a description of CSG modeling systems and prior art modification methods.

In a CSG 3D modeling system, a 3D model (also referred to as an object model) may be constructed, displayed, modified, etc. as illustrated in FIG. 1. An object model is comprised of one or more geometries such as a block 100, cylinder, sphere, polyline extrusion, etc. Each type of geometry is also referred to as a primitive or geometric primitive.

In addition to simple primitives (e.g., a block, sphere, etc.), a geometry may be made up of several primitives. Such a geometry is referred to as a composite or composite model and is created through one or more Boolean operations (such as addition [joint model] or subtraction [holes]). FIG. 2 illustrates a composite model created through one or more Boolean operations. The components 200A–200B (i.e., geometries/primitives) that make up a composite model 200 may also be referred to as features. Several primitives/features 200A–200B that are joined through addition and have a common (merged) face are referred to as merged features. For example, two joined blocks with the same height that are tied together is referred to as a composite with merged block features. As illustrated in FIG. 2, the block 200A and cylinder cutout 200B are merged and have a common face.

Parameters are used to describe each geometry/primitive/feature. For example, a block 100 may have parameters for width, depth, length, side wall tapers, etc. Similarly, a cylinder may have parameters for radius, height, side wall taper, etc. Further, the boundary or outline of the geometry is referred to as a boundary representation for the geometry.

For each primitive, a control is utilized to adjust the parameters for the primitive. Referring to FIGS. 1 and 2A, each control has several user interface elements (referred to as handles 102A–102F, 104A–104B, 106, and 202A–F, 204, and 206) that allow a user to input information for a parameter through the use of a mouse. For example, a handle may provide how much the width of a block 100 should be changed. A handle may either be a linear handle (to adjust linear parameters) (e.g., handles 104A, 104B, and 204) or a planar handle (to adjust planar parameters) (e.g., handles 102A–F and 202A–F). Accordingly, a block's 100 control may have one or more of the following handles 102–106: a width handle (e.g., handles 102B and 102E), depth handle (e.g., handles 102C and 102F), height handle (e.g., handles 102A and 102D), edge (changes the side wall taper) handle (e.g., handles 104A–104B), a hidden handle on each face of the block 100, and a block 100 handle (e.g., handle 106) for moving the entire block 100. Both block 200A and cylinder cutout 200B may be independently selected to display the appropriate handles (i.e., handles 102–106 and 202–206) for use in modifying each component 200A/200B.

An algorithm for modifying a geometry is implemented in a method of a control (referred to as a handle dragged method). For example, if a hidden face handle is being dragged (e.g., using a mouse or cursor control device), the algorithm for modifying the geometry's appropriate face will be implemented such that the face is moved locally. Accordingly, only the face will be moved while any other part of the geometry remains unchanged. In this respect, to move a face of a composite, the merged faces must be independently and individually modified through user input (i.e., through the face handles) so that the faces remain consistent (e.g., planar). For example, as illustrated in FIG. 2B, if the front face of block 200A is modified, the cylindrical cutout 200B is not moved simultaneously. Thus, if the front face of block 200A is moved forward, the cylindrical cutout 200B would likely disappear with the length of the cylindrical cutout 200B remaining in the same location. Accordingly, the user must independently select cylindrical cutout 200B and extend its length to match any modification to block 200A.

Once modified, a view, for each primitive, implements the functionality for displaying a model using information from the geometry. A tool may be used to implement functionalities for getting and passing user interface information (i.e., handle information), such as mouse events to create or modify geometry.

As described above, to modify the primitives/features, the individual parameters of the primitives/features are modified. Accordingly, each parameter is typically modified by the user using dialogs or handles on a feature-by-feature basis. The same result can also be achieved by changing the model's boundary representation directly (i.e., not by modifying feature parameters). However, when the boundary representation of the model is changed directly, either the entire model is converted to a simple boundary representation (thereby discarding the knowledge of the primitives that were originally used to create the model), losing the procedural CSG history and thus the ability/advantages to modifying the model using feature parameters, or an additional operation is added to the procedural history. Such a conversion and/or additional operation is time consuming, complicated, and adds unnecessary complications to the modification process. Alternatively, the modifications to the geometry can be added as specific operations to the CSG history, but this introduces additional layers of complexity to subsequent interaction with the model.

Accordingly, what is needed is a method, system, and article of manufacture for easily modifying a composite geometry without requiring multiple steps from a user, without converting a model to a boundary representation, and without adding an additional operation to the procedural history.

SUMMARY OF THE INVENTION

In a traditional three dimensional (3D) constructive solid modeling (CSG) system, a composite model is constructed through Boolean operations on features, which are various geometric primitives (e.g., blocks and cylinders). A model can be modified by changing the parameters of the individual features that make up the model or by changing the boundary representation of the model directly. Feature parameters include things like height, width, length, or radius. These parameters are typically modified by the user using dialogs or handles on a feature-by feature basis. When the boundary representation of a model is changed directly (i.e., not by modifying feature parameters) either the model is converted to a boundary representation or an additional operation is added to the CSG procedural history.

A face modification tool in accordance with one or more embodiments of the invention allows repositioning of a model's faces directly without any of the aforementioned side effects. The tool can modify the face of simple primitives directly, without the need to individually edit parameters. The tool also modifies faces with holes or complex faces by modifying the individual features simultaneously in such a way as to satisfy user expectation.

Using the tool, a face of a composite model is selected. Thereafter, the tool automatically selects other features/components affected by the selected face. When the face is dragged (e.g., using a cursor control device such as a mouse), the tool simultaneously moves all affected components in accordance with the user's expectations.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

A model can be modified by changing the parameters of the individual features that make up the model or by changing the boundary representation of the model directly. Feature parameters include things like height, width, length, or radius. These parameters are typically modified by the user using dialogs or handles on a feature-by feature basis. When the boundary representation of a model is changed directly (i.e., not by modifying feature parameters), either the model is converted to a boundary representation or an additional operation is added to a procedural history for the CSG application.

In one or more embodiments of the invention, a face modification tool enables the repositioning of a model's faces directly without any of the aforementioned side effects. The tool can modify the faces of simple primitives directly, without the need to independently edit parameters. Thus, a user may directly drag faces of a composite model to change the geometry of the model without having to select individual primitives and pull handles or otherwise modify the parameters of the primitive to achieve the intended result. When the user pushes or pulls on a face of the model with a cursor, the tool automatically identifies the underlying feature or primitive and determines how the parameters of that primitive will have to change in order to achieve the intended result. Further, the tool enables the modification of composites such as faces with holes or complex faces by modifying the individual features simultaneously and automatically in such a way as to satisfy user expectation. As a result, there is no alteration to the procedural history and the features of the model are maintained (i.e., the model is not converted to a boundary representation).

Hardware Environment

Figure 3:
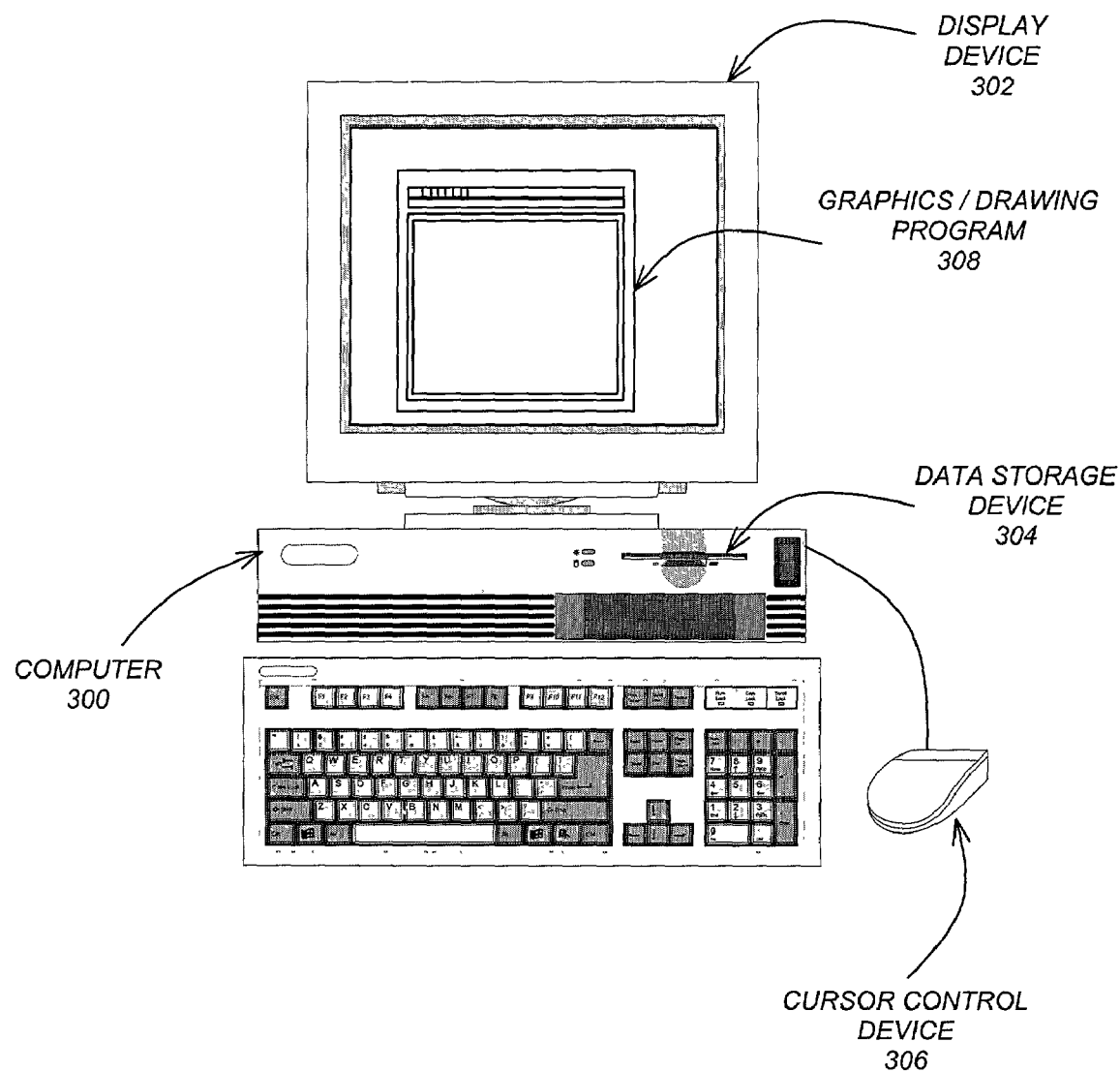
FIG. 3 schematically illustrates a hardware and software environment in accordance with one or more embodiments of the invention.

FIG. 3 is an exemplary hardware and software environment used to implement one or more embodiments of the invention. Embodiments of the invention are typically implemented using a computer 300, which generally includes, inter alia, a display device 302, data storage devices 304, cursor control devices 306, and other devices. Those skilled in the art will recognize that any combination of the above components, or any number of different components, peripherals, and other devices, may be used with the computer 100.

One or more embodiments of the invention are implemented by a computer-implemented graphics program 308 such as a constructive solid modeling (CSG) application, wherein the graphics program 308 is represented by a window displayed on the display device 302. Generally, the graphics program 308 comprises logic and/or data embodied in or readable from a device, media, carrier, or signal, e.g., one or more fixed and/or removable data storage devices 304 connected directly or indirectly to the computer 300, one or more remote devices coupled to the computer 300 via a data communications device, etc.

Those skilled in the art will recognize that the exemplary environment illustrated in FIG. 3 is not intended to limit the present invention. Indeed, those skilled in the art will recognize that other alternative environments may be used without departing from the scope of the present invention. For example, embodiments of the invention may be implemented in a distributed computer system using a network to connect client computers to server computers. The graphics application 308 may be distributed, activated, enabled, and utilized in such a distributed environment.

Generally, components of the invention comprise logic and/or data that is embodied in or retrievable from device, medium, signal, or carrier, e.g., a data storage device, a data communications device, a remote computer or device coupled to the computer across a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Software Embodiments

As described above, the drawing program 308 may comprise a constructive solid modeling system/program. Such a solid modeling system is configured to construct, modify, display, and print 3D models. A face modification tool of the solid modeling system allows repositioning of a model's faces directly without one or more of the side effects of the prior art. The face modification tool can modify the faces of simple primitives directly, without the need to edit parameters individually/independently. Further, the tool provides for the modification of faces with holes or complex faces by modifying the individual features simultaneously in such a way as to satisfy user expectation. As a result, there is no alteration to the 3D model's procedural history and the features of the model are maintained.

To utilize the face modification tool of the invention, the user may select/activate the tool by selecting the tool using a cursor control device 306, through a menu system, or via any other method available. Once the tool has been selected, the user may freely select any face of a model. The face selection process may merely comprise moving a cursor over a displayed face or moving a cursor and depressing a button of a cursor control device 306 such as a mouse. Alternatively, a keyboard or menu-based selection process may be utilized.

Figure 1:
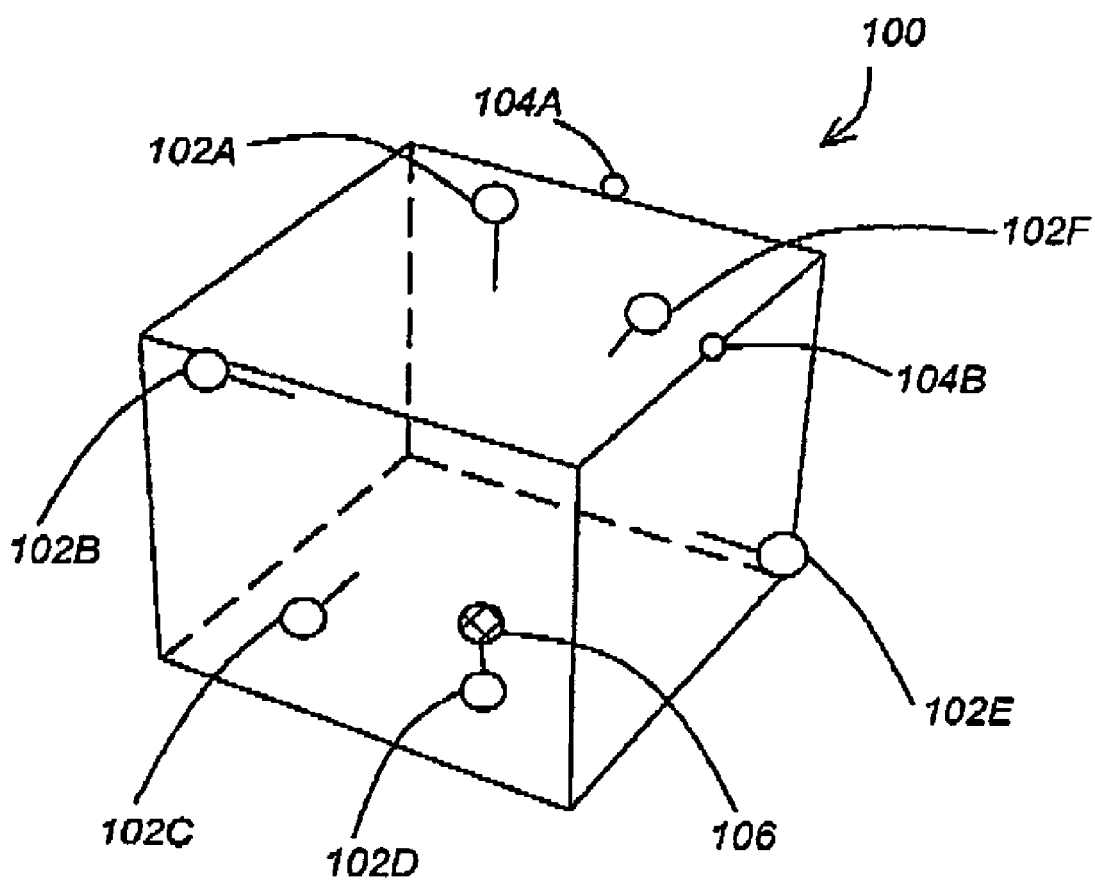
FIG. 1 illustrates a 3D model.
Figure 2A:
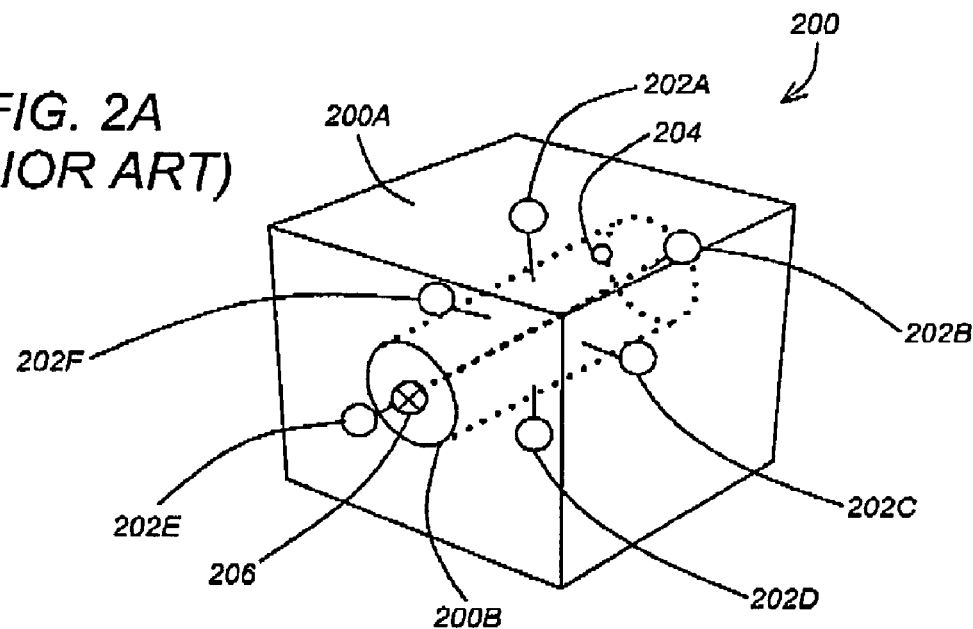
FIG. 2A illustrates a composite model created through one or more Boolean operations.
Figure 2B:
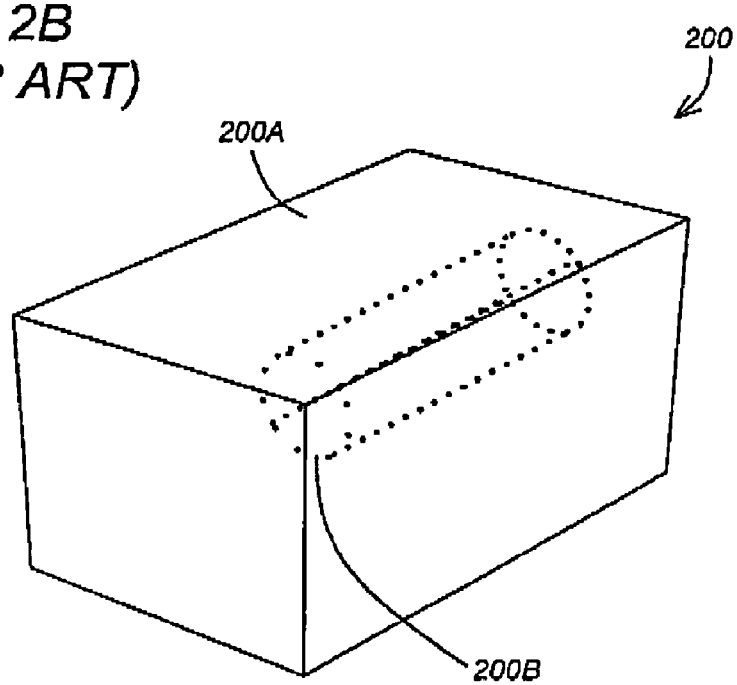
FIG. 2B illustrates a modified composite model.
Figure 4A:
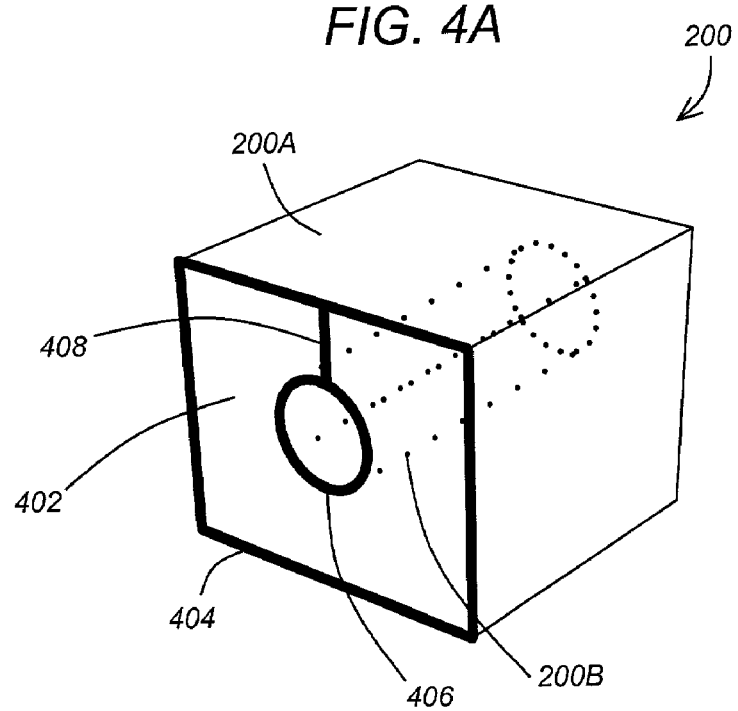
FIG. 4A illustrates the composite model of FIG. 2A wherein a face has been selected for modification in accordance with one or more embodiments of the invention.

Once selected, to differentiate a selected face from remaining faces, the boundary representation of a selected face may be highlighted such that it is displayed in a different color, darkness/thickness, pattern, etc. For example, FIG. 4A illustrates the model 200 of FIG. 2A wherein face 402 has been selected for modification. As illustrated, the boundary representation 404 of block 200A that lies on face 402 is displayed in an increased thickness to differentiate it from other faces of block 200A. Further, boundary representations that lie on face 402 of any affected components are also selected and displayed accordingly. For example, in FIG. 4A, both the boundary representation 404 of block 200A and the boundary representation 406 of cylindrical cutout 200B that lie on merged face 402 are selected and displayed in an increased thickness to indicate their selection. Additionally, unlike the prior art (as illustrated in FIGS. 1 and 2A–B), only the boundary representation 404–408 may be displayed instead of multiple handles which may confuse the user and clutter the display.

Figure 4B:
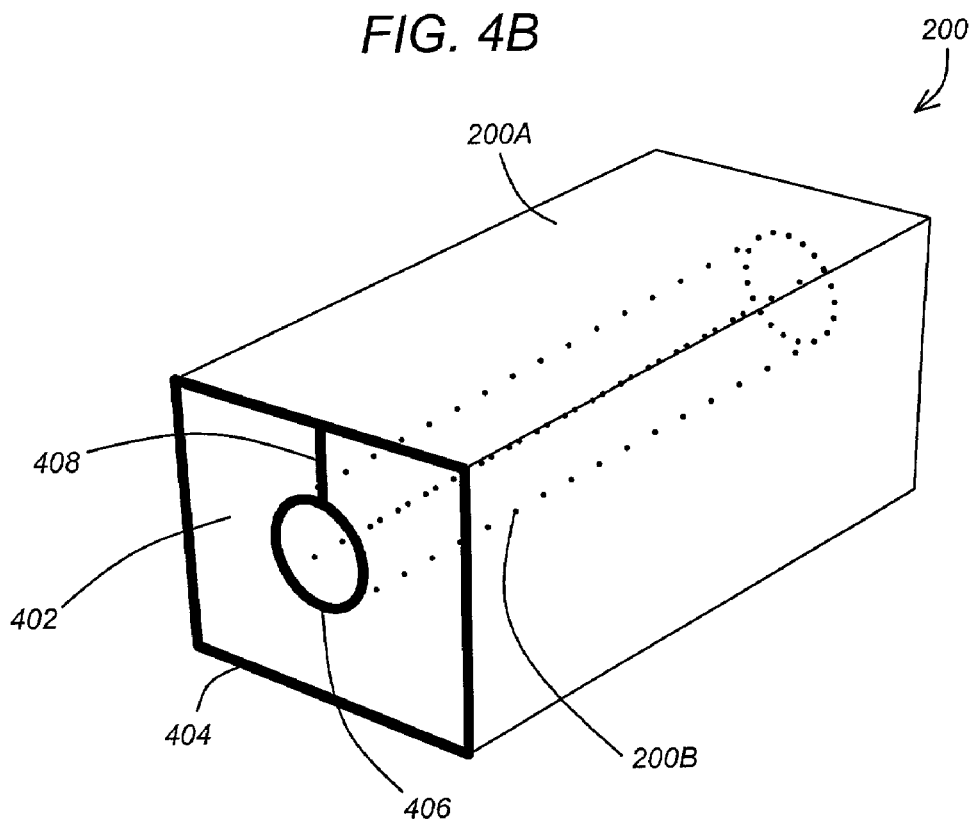
FIG. 4B illustrates a modified composite model in accordance with one or mote embodiments of the invention.

Once a face 402 has been selected, the face 402 may be moved/modified by the user such that all components/features that lie on the face (i.e., those that are indicated as being selected) are moved as directed. As illustrated in FIG. 4B, face 402 has been moved such that the depth of block 200A has increased. By using the face modification tool, the depth of cylindrical cutout 200B is also extended in accordance with the user's expectations. Such an automatic extension of the cylindrical cutout as illustrated in FIG. 4B is contrary to that of the prior art which required both block 200A and cylindrical cutout 200B to be independently adjusted to extend face 402.

Figure 5A:
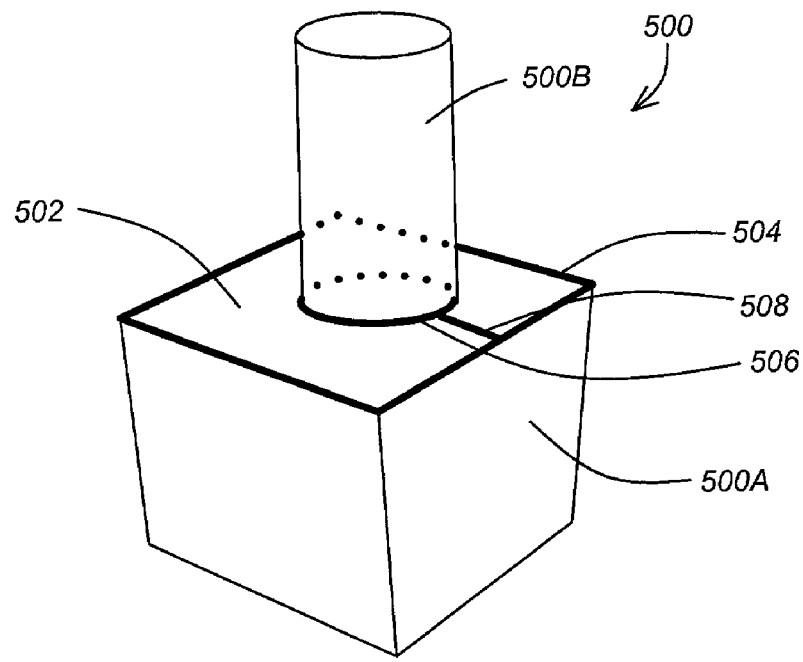
FIGS. 5A and 5B illustrate an example of a joint model having a block joined with a cylinder sharing a selected merged face in accordance with one or more embodiments of the invention.
Figure 5B:
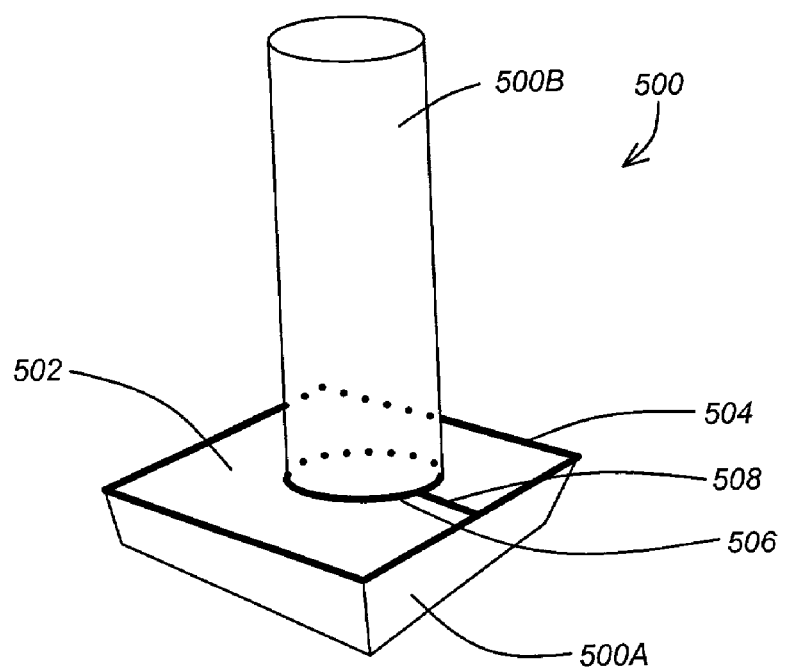

FIGS. 5A and 5B illustrate an example of a joint model 500 having a block 500A joined with a cylinder 500B sharing a merged face 502. In both FIGS. 5A and 5B, the merged face 502 has been selected. The selection is indicated in FIGS. 5A and 5B with bold/increased thickness of the boundary representation 504 and 506. Additionally, when the face is selected, a link 508 may also be displayed which indicates that block 500A and cylinder 500B are merged (i.e., part of a joint model).

Upon selection of face 502, the user may drag the cursor control device 306 to move the face 502 downward. In accordance with the user's expectations, the bottom face of cylinder 500B is moved downward simultaneously with the face 502 of block 500A. This automatic movement is distinguishable from the prior art in which the bottom face of the cylinder 500B would remain at the location indicated in FIG. 5A and face 502 would drop away from the cylinder 500B. Accordingly, the user would be forced to manually adjust the cylinder 500B in addition to manually adjusting block 500A. Thus, such an automatic movement of affected faces provides a simple and easy to use graphical user interface.

Figure 6:
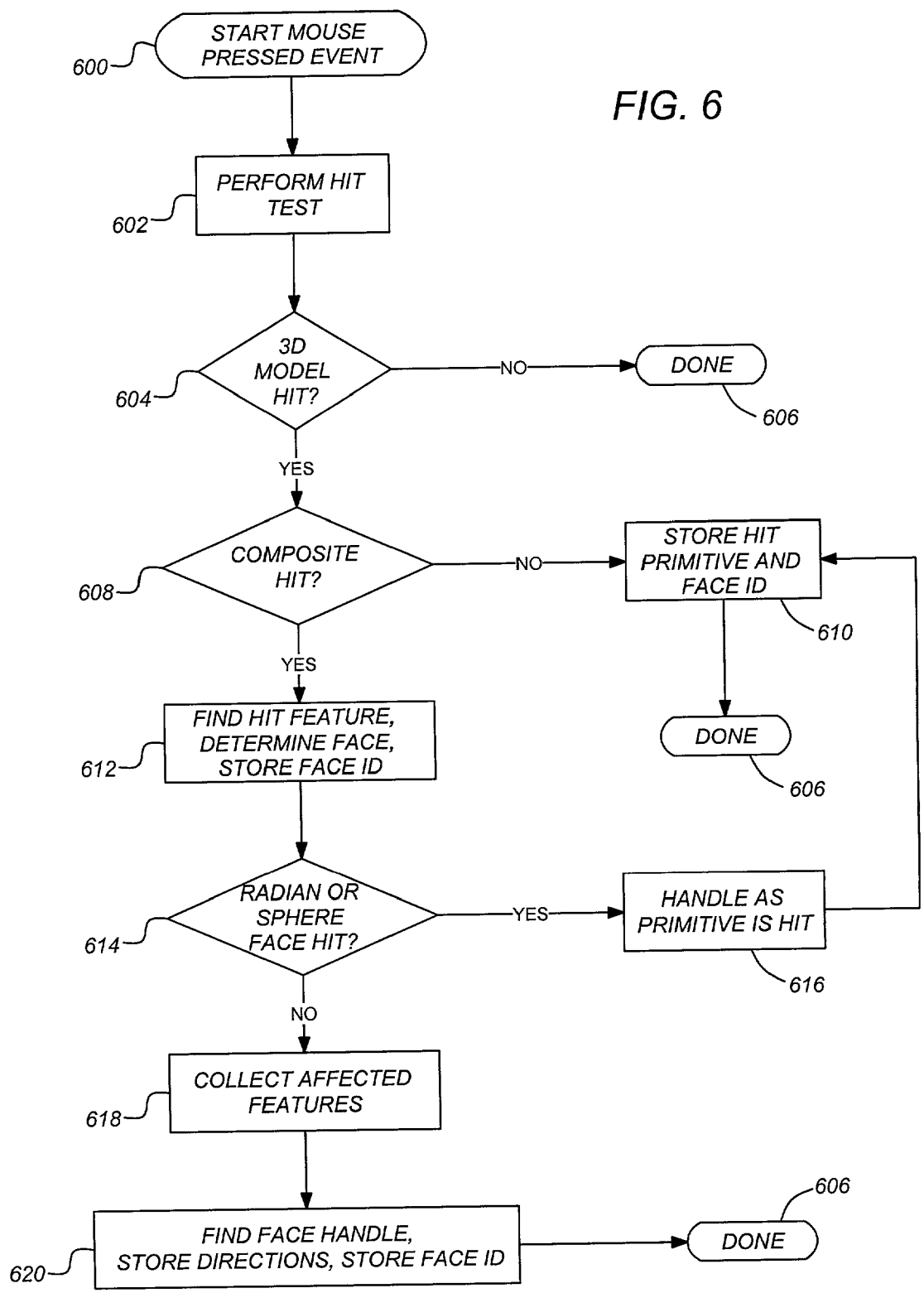
FIG. 6 is a flow chart illustrating the selection of a face in accordance with one or more embodiments of the invention.

FIG. 6 is a flow chart illustrating the selection of a face in accordance with one or more embodiments of the invention. At step 600, a button of a mouse or cursor control device 306 is pressed. At step 602, a hit test is performed to determine what has been hit. In other words, a determination is made regarding whether the cursor is located over a particular object. At step 604, a determination is made regarding whether a 3D model has been hit. If the model has not been hit, the process is complete at step 606.

If a 3D model has been hit, a determination is made at step 608 regarding whether a composite has been hit. If a composite has not been hit, then a primitive has been hit. Accordingly, the hit primitive is stored and a face identification (referred to as a face ID) for the face of the primitive that has been hit is stored at step 610. The process is then complete at step 606.

If a composite has been hit, several steps are performed at step 612. The feature of the composite that has been hit is determined. Additionally which face of the feature that has been hit is determined and the face ID for the hit face is stored. At step 614, a determination is made regarding whether the hit face is a cylinder's radian face or a sphere's face. If a cylinder's radian face or sphere's face has been hit, the face modification tool handles the hit as a primitive at step 616 and proceeds at step 610.

If a cylinder's radian face or sphere's face has not been hit, features that are affected by the selected hit face are collected at step 618. Affected features are features that share a merged face with a selected face. For example, affected features may include holes or merged features on the hit face. At step 620, the face handles of each affected feature are examined to find one face handle whose direction is closest to the cursor control device 306 dragging direction. The directions and face Ids of the found face handles are then stored. The process is then complete at step 606.

Figure 7:
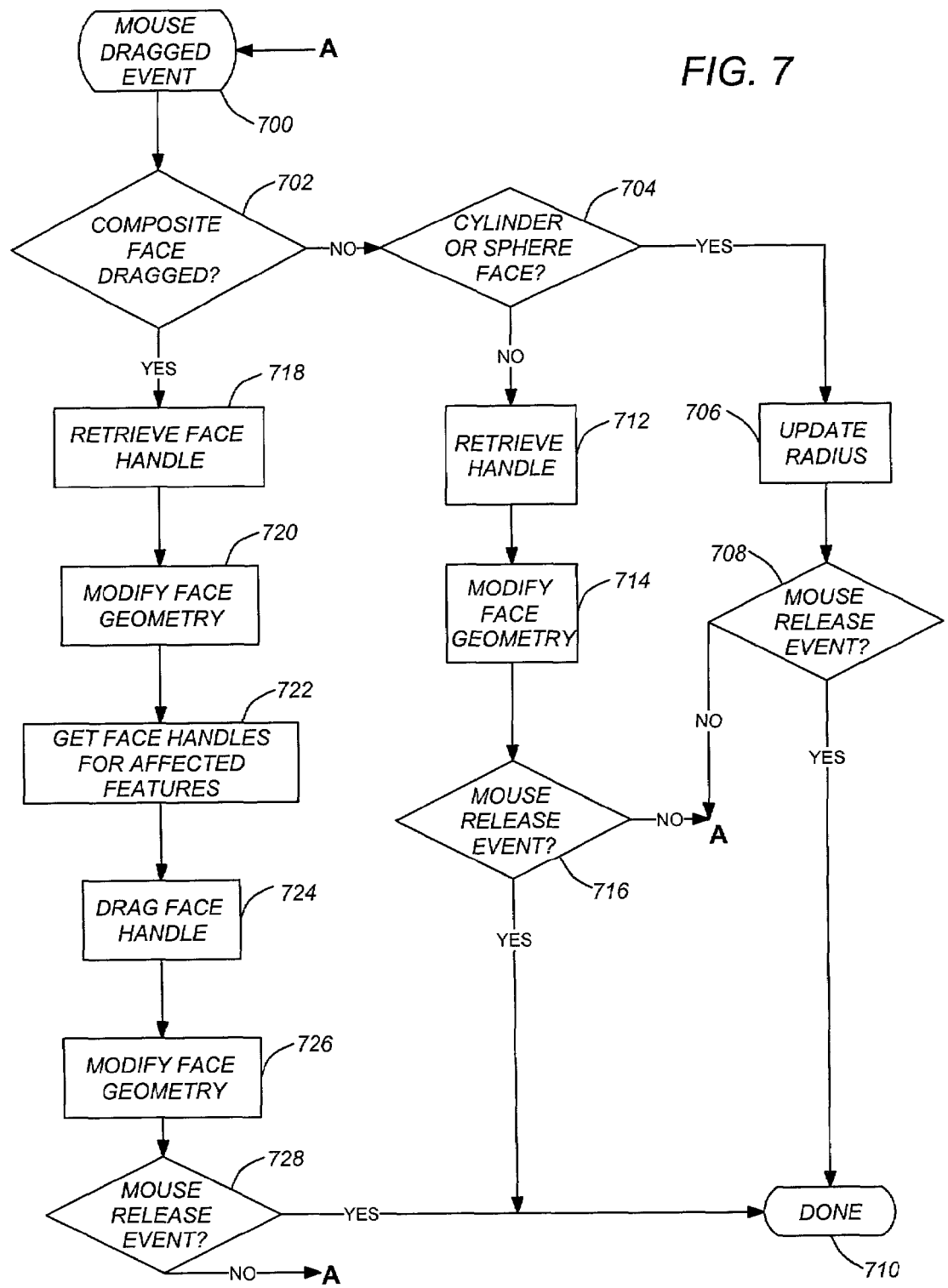
FIG. 7 is a flow chart illustrating the modification of a face using the face modification tool in accordance with one or more embodiments of the invention.

FIG. 7 is a flow chart illustrating the modification of a face using the face modification tool in accordance with one or more embodiments of the invention. After the face (and affected faces) has been selected as set forth in FIG. 6, the cursor control device 306 (e.g., a mouse) is dragged at step 700. At step 702, a determination is made regarding whether a composite's face (e.g., a face with holes or other merged faces) is being dragged.

If a composite face is not being dragged, a determination is made at step 704 regarding whether a cylinder's radian face or a sphere's face is being dragged. If a cylinder's radian face or sphere's face is being dragged, the radius is updated at step 706. At step 708, a determination is made regarding whether the dragging event is complete (e.g., if the cursor control device's 306 button has been released). If the event is complete the process is terminated at step 710. If the event is not complete, processing is repeated commencing with step 700.

If a cylinder's radian face or sphere's face is not being dragged, a handle is retrieved using the face ID at step 712. A handle's dragging method (e.g., a handle dragged method) is then called to modify the geometry's parameters to move the hit face locally at step 714. A determination is made at step 716 regarding whether the dragging event is complete. If complete, the process is terminated at step 710. If the dragging event is not complete, the processing repeats at step 700 until the dragging event has been completed.

If at step 702, a determination is made that a composite face is being dragged, the face ID (i.e., the face ID stored at step 612) is used to retrieve a face handle for the hit face at step 718. At step 720 the geometry for the hit face is modified pursuant to the dragging event. Accordingly, a call is made to the appropriate handle's dragging method that modifies the geometry's parameters such that the hit face appears to have moved.

At step 722, all of the affected features are examined to find face handles using the stored face IDs. At step 724, each of the found face handles are dragged along the stored direction (i.e., the direction stored at step 620). At step 726, the face handle's dragging method is called to modify the geometry's parameters to move the face locally. At step 728, a determination is made regarding whether the dragging event is complete. If the dragging event is not complete, processing is repeated (e.g., until the dragging event is complete and the cursor control device 306 release event commences) commencing at step 700.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide for modifying a three-dimensional model. Such a model may include a composite 3D model. A composite 3D model in a computer implemented solid modeling system is comprised of two or more primitives, joined together using constructive solid geometry (e.g., through one or more Boolean operations). Once a model is displayed, a face is selected (referred to hereafter as the first face) (e.g., by a user) and the feature to which it belongs is identified (referred to hereafter as first primitive) (e.g., using a cursor control device 306). The selection process may be based on the location of a displayed cursor and may comprise storing a face identification for the selected face.

The boundary representation for the first primitive is then modified (e.g., in response to a dragging of a cursor control device 306). Such a modification may identify a handle using a stored face identification and utilize a method of the handle (e.g., a handle dragged method) to modify the boundary representation (e.g., by modifying one or more parameters of the first primitive) in accordance with the dragging of a cursor control device 306 to achieve the expected result in the model. However, it should be noted that the parameters of the primitive may or may not be modifiable by a handle provided in a particular implementation. Each primitive may have a certain set number of parameters, but any number of different types of handles that modify one or more parameters at a time may be provided to achieve various behaviors. Accordingly, a mapping of parameters to handles may not be required for the invention. Instead, a correspondence between a moving face and modifying one or more parameters may be defined.

Thus, the manipulation of the boundary representation may be translated into a manipulation of feature parameters so that the CSG history of the model is maintained, just as if a feature (or features) had been selected and a handle pulled (or parameters modified in some other way). Accordingly, the model is edited using the boundary representation without converting the model into a boundary representation or alternatively inserting special modification operations into a procedural history of the model (both of which would limit or change subsequent editing behavior of the model).

Additional faces may be affected by the first face. To accommodate such affected faces, the boundary representation of a second primitive is automatically modified based on the modification to the first boundary representation. The automatic modification may comprise automatically identifying a second face (that is affected by the selected first face) of the second primitive (e.g., by storing a face identification for the second face). Further, once selected, the boundary representation of the second face may be automatically modified by identifying a handle (using the stored second face identification) and utilizing a method of the handle (e.g., a handle dragged method) to automatically modify the second boundary representation (i.e., the primitives and parameters of the second boundary representation) in accordance with the dragging of the cursor control device 306. Such modifications do not require a user to individually modify feature parameters of the composite model, the composite model is not converted to a boundary representation, and an additional operation is not added to a procedural history. Additionally, the second and first boundary representations are modified simultaneously and maintain the geometric correspondence between the first face and the additional primitives according to user expectation.

Accordingly, one or more embodiments of the invention provide for the automatic conversion of a user's intention expressed in terms of the resulting geometry of the composite model into a modification of the parameters of a specific feature that will achieve the same result, thus preserving the original CSG history and avoiding adding new operations to that history.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for modifying a three-dimensional model, comprising:
   displaying a composite three-dimensional model in a computer implemented solid modeling application, wherein the composite model comprises a first primitive and a second primitive;
   selecting a first face of the first primitive;
   modifying a first boundary representation of the first primitive using the selected first face without converting rue composite model into a boundary representation; and
   automatically modifying a second boundary representation of the second primitive based on the modification to the first boundary representation.

2. The method of claim 1 wherein the second boundary representation is modified simultaneously with the modification to the first boundary representation.

3. The method of claim 1, wherein the modifications to the first boundary representation and second boundary representation do not require a uses to individually modify feature parameters of the composite model.

4. The method of claim 1, wherein an additional operation is not added to a procedural history when the first boundary representation is modified.

5. The method of claim 1, wherein:
   the first face is selected using a cursor control device; and
   the first boundary representation is modified in response to a dragging of the cursor control device in a first direction.

6. The method of claim 5, wherein:
   (a) selecting the first face comprises:
      (i) selecting the first face of the first primitive based on a cursor location; and
      (ii) storing a first face identification for the first face; and
   (b) modifying the first boundary representation comprises:
      (i) identifying a first handle using the stored first face identification; and
      (ii) utilizing a first method associated with the first handle to modify one or more parameters of the first primitive which thereby modifies the first boundary representation in accordance with the dragging of the cursor control device.

7. The method of claim 6 further comprising:
   automatically selecting a second face of a second primitive of the composite model, wherein the second face is affected by the selected first face;
   storing a second face identification for the second face; and
   wherein the automatic modification of the second boundary representation comprises:
      identifying a second handle using the stored second face identification; and
      utilizing a second method associated with the second handle to automatically modify the second boundary representation in accordance with the dragging of the cursor control device.

8. The method of claim 1, wherein the first primitive and second primitive are combined in the composite model through one or more Boolean operations.

9. A computer-implemented solid modeling system comprising:
   (a) a computer having a memory;
   (b) a solid modeling application executing the computer;
   (c) a composite three-dimensional model displayed by the solid modeling application, wherein the composite model comprises:
      (i) a first primitive having a first face and a first boundary representation; and
      (ii) a second primitive having a second face and a second boundary representation;
   (d) a face modification tool in the solid modeling application, configured to:
      (i) select the first face;
      (ii) modify the first boundary representation using the selected first face without converting the composite three-dimensional model into a boundary representation; and
      (iii) automatically modify the second boundary representation based on the modification to the first boundary representation.

10. The system of claim 9 wherein the second boundary representation is modified simultaneously with the modification to the first boundary representation.

11. The system of claim 9, wherein the modifications to the first boundary representation and second boundary representation do not require a user to individually modify feature parameters of the composite model.

12. The system of claim 9, wherein an additional operation is not added to a procedural history when the first boundary representation is modified.

13. The system of claim 9, wherein:
   the first face is selected using a cursor control device; and
   the first boundary representation is modified in response to a dragging of the cursor control device in a first direction.

14. The system of claim 13, wherein:
   (a) the first face is selected based on a cursor location;
   (b) the first face is associated with a first face identification;
   (c) the face modification tool is further configured to:
      (i) store the first face identification for the selected first face;
      (ii) identify a first handle using the stored first face identification; and
      (ii) utilize a first method associated with the first handle to modify one or more parameters of the first primitive which thereby modifies the first boundary representation in accordance with the dragging of the cursor control device.

15. The system of claim 14, wherein the face modification tool is further configured to:
   automatically select the second face, wherein the second face is affected by the selected first face;
   storing a second face identification for the second face; and wherein the face modification tool is configured to automatically modify the second boundary representation by:
  identifying a second handle using the stored second face identification; and
  utilizing a second method associated with the second handle to automatically modify the second boundary representation in accordance with the dragging of the cursor control device.

16. The system of claim 9, wherein the first primitive and second primitive are combined in the composite model through one or more Boolean operations.

17. An article of manufacture comprising a program storage medium readable by a computer and embodying logic executable by the computer to perform a method for modifying a three-dimensional model, wherein the method comprises:
  displaying a composite three-dimensional model in a computer implemented solid modeling system, wherein the composite model comprises a first primitive and a second primitive;
  selecting a first face of the first primitive;
  modifying a first boundary representation of the first primitive using the selected first face without converting the composite model into a boundary representation; and
  automatically modifying a second boundary representation of the second primitive based on the modification to the first boundary representation.

18. The article of manufacture of claim 17 wherein the second boundary representation is modified simultaneously with the modification to the first boundary representation.

19. The article of manufacture of claim 17, wherein the modifications to the first boundary representation and second boundary representation do not require a user to individually modify feature parameters of the composite model.

20. The article of manufacture of claim 17, wherein an additional operation is not added to a procedural history when the first boundary representation is modified.

21. The article of manufacture of claim 17, wherein:
  the first Lace is selected using a cursor control device; and
  the first boundary representation is modified in response to a dragging of the cursor control device in a first direction.

22. The article of manufacture of claim 21, wherein the method for:
  (a) selecting the first face comprises;
    (i) selecting the first face of the first primitive based on a cursor location; and
    (ii) storing a first face identification for the first face; and
  (b) directly modifying the first boundary representation comprises:
    (i) identifying a first handle using the stored first face identification; and
    (ii) utilizing a first method associated with the first handle to modify one or more parameters of the first primitive which thereby modifies the first boundary representation in accordance with the dragging of the cursor control device.

23. The article of manufacture of claim 22, wherein the method further comprises:
  automatically selecting a second face of a second primitive of the composite model, wherein the second face is affected by the selected first face;
  storing a second face identification for the second face; and wherein the automatic modification of the second boundary representation comprises:
  identifying a second handle using the stored second face identification; and
  utilizing a second method associated with the second handle to automatically modify the second boundary representation in accordance with the dragging of the cursor control device.

24. The article of manufacture of claim 17, wherein the first primitive and second primitive are combined in the composite model through one or more Boolean operations.

25. A method for modifying a three-dimensional model, comprising:
  displaying a three-dimensional model in a computer implemented solid modeling system, wherein the three-dimensional model comprises one or more primitives and the one or more primitives each comprise one or more feature parameters;
  selecting a faze of the model by selecting the face in a boundary representation of the three-dimensional model; and
  modifying the boundary representation using the selected face by translating a manipulation of the boundary representation into a manipulation of the one or more feature parameters without converting the three-dimensional model into boundary representation.

26. The method of claim 25 wherein special modification operations are not inserted into a procedural history.

27. The method of claim 25, wherein a procedural history of the model is maintained.

28. The method of claim 25, wherein the manipulation of the one or more feature parameters do nor require a user to individually modify each feature parameter.

29. The method of claim 25, wherein:
  the face is selected using a cursor control device; and
  the boundary representation is modified in response to a dragging of the cursor control device in a first direction.

30. A computer-implemented solid modeling system comprising:
  (a) a computer having a memory;
  (b) an solid modeling application executing on the computer;
  (c) a three-dimensional model displayed in the solid modeling application, wherein the model comprises one or more primitives and each primitive comprises:
    (i) a face;
    (ii) a boundary representation; and
    (iii) one or more feature parameters;
  (d) a face modification tool in the solid modeling application, configured to:
    (i) select the face by selecting the face in the boundary representation;
    (ii) modify the boundary representation using the selected first face by translating a manipulation of the boundary representation into a manipulation of the one or more feature parameters without converting rho three-dimensional model into a boundary representation.

31. The system of claim 21 wherein special modification operations are not inserted into a procedural history.

32. The system of claim 21 wherein a procedural history of the model is maintained.

33. The system of claim 21, wherein the manipulation of the one or more feature parameters do not require a user to individually modify each feature parameter.

34. The system of claim 21, wherein:

the face is selected using a cursor control device; and the boundary representation is modified in response to a dragging of the cursor control device in a first direction.

35. An article of manufacture comprising a program storage medium readable by a computer and embodying logic executable by the computer to perform a method for modifying a three-dimensional model, wherein the method comprises:

displaying a three-dimensional model in a computer implemented solid modeling system, wherein the model comprises one or more primitives and the one or more primitives each comprise one or more feature parameters;

selecting a face of the model by selecting the face in a boundary representation of the model; and modifying the boundary representation using the selected first face by translating a manipulation of the boundary representation into a manipulation of the one or more feature parameters without converting the three-dimensional model into a boundary representation.

36. The article of manufacture of claim 35 wherein special modification operations are not inserted into a procedural history.

37. The article of manufacture of claim 35 wherein a procedural history of the model is maintained.

38. The article of manufacture of claim 35, wherein the manipulation of the one or more feature parameters do not require a user to individually modify each feature parameter.

39. The article of manufacture of claim 35, wherein:

the face is selected using a cursor control device; and the boundary representation is modified in response to a dragging of the cursor control device in a first direction.

* * * * *

UNITED STATES PATENT AND TRADEMARK OFFICE
CERTIFICATE OF CORRECTION

PATENT NO.         : 7,092,859 B2
APPLICATION NO.    : 10/132544
DATED              : August 15, 2006
INVENTOR(S)        : Sha Wang et al.

Page 1 of 1

It is certified that error appears in the above-identified patent and that said Letters Patent is hereby corrected as shown below:

In the Claims

Column 9, line 36, Claim 3, please delete the word "uses" and replace with the word --user--.

Column 10, line 15, Claim 9(b), please insert the word --on-- between the words --executing-- and --the--.

Column 11, line 41, Claim 21, please delete the word "Lace" and replace with the word --face--.

Column 12, line 19, Claim 25, please delete the word "faze" and replace with the word --face--.

Column 12, line 32, Claim 28, please delete the word "nor" and replace with the word --not--.

Column 12, line 59, Claim 30, please delete the word "rho" and replace with the word --the--.

Signed and Sealed this
Twentieth Day of May, 2014

Michelle K. Lee
*Deputy Director of the United States Patent and Trademark Office*